(12) United States Patent
Doody et al.

(10) Patent No.: US 6,874,102 B2
(45) Date of Patent: Mar. 29, 2005

(54) COORDINATED RECALIBRATION OF HIGH BANDWIDTH MEMORIES IN A MULTIPROCESSOR COMPUTER

(75) Inventors: John W. Doody, Dublin (IE); Finbarr Denis Long, Blackrock (IE); Michael McLoughlin, Dublin (IE); Michael James O'Keefe, Dublin (IE)

(73) Assignee: Stratus Technologies Bermuda Ltd., Hamilton (BM)

( * ) Notice: Subject to any disclaimer, the term of this patent is extended or adjusted under 35 U.S.C. 154(b) by 690 days.

(21) Appl. No.: 09/799,478

(22) Filed: Mar. 5, 2001

(65) Prior Publication Data

US 2002/0124202 A1 Sep. 5, 2002

(51) Int. Cl.[7] .............................................. G06F 11/00
(52) U.S. Cl. ............................................ 714/12; 714/5
(58) Field of Search ............................ 714/5, 11, 12

(56) References Cited

U.S. PATENT DOCUMENTS

| | | | |
|---|---|---|---|
| 3,460,094 A | 8/1969 | Pryor ........................ | 340/172.5 |
| 3,468,241 A | 9/1969 | Leslie et al. ................. | 100/26 |
| 3,469,239 A | 9/1969 | Richmond et al. ........ | 340/172.5 |
| 3,544,973 A | 12/1970 | Borck, Jr. et al. ........ | 340/172.5 |
| 3,548,382 A | 12/1970 | Lichty et al. ............. | 340/172.5 |
| 3,609,704 A | 9/1971 | Schurter ................... | 340/172.5 |
| 3,641,505 A | 2/1972 | Artz et al. ................ | 340/172.5 |
| 3,705,388 A | 12/1972 | Nishimoto ............... | 340/172.5 |
| 3,710,324 A | 1/1973 | Cohen et al. ............ | 340/172.5 |
| 3,736,566 A | 5/1973 | Anderson et al. ........ | 340/172.5 |
| 3,795,901 A | 3/1974 | Boehm et al. ........... | 340/172.5 |
| 3,805,039 A | 4/1974 | Stiffler ...................... | 235/153 |
| 3,893,084 A | 7/1975 | Kotok et al. ............. | 340/172.5 |
| 4,015,246 A | 3/1977 | Hopkins, Jr. et al. .... | 340/172.5 |
| 4,040,034 A | 8/1977 | Belady et al. ............ | 364/200 |
| 4,096,572 A | 6/1978 | Namimoto ................ | 364/200 |
| 4,164,787 A | 8/1979 | Aranguren ............... | 364/200 |
| 4,228,496 A | 10/1980 | Katzman et al. .......... | 364/200 |
| 4,296,463 A | 10/1981 | Dalboussiere et al. .... | 364/200 |
| 4,356,550 A | 10/1982 | Katzman et al. .......... | 364/200 |
| 4,365,295 A | 12/1982 | Katzman et al. .......... | 364/200 |
| 4,366,535 A | 12/1982 | Cedolin et al. ........... | 364/200 |
| 4,466,098 A | 8/1984 | Southard ................... | 371/9 |
| 4,484,273 A | 11/1984 | Stiffler et al. ............. | 364/200 |
| 4,493,036 A | 1/1985 | Boudreau et al. ......... | 364/200 |
| 4,503,499 A | 3/1985 | Mason et al. ............. | 364/200 |

(Continued)

FOREIGN PATENT DOCUMENTS

| | | | | |
|---|---|---|---|---|
| EP | 0 208 430 A1 | 1/1987 | ........... | G06F/13/32 |
| EP | 0 428 330 A3 | 5/1991 | ........... | G06F/13/30 |
| EP | 0 428 330 A2 | 5/1991 | ........... | G06F/13/32 |
| EP | 0 406 759 A3 | 9/1991 | ........... | H04L/12/56 |
| EP | 0 475 005 B1 | 11/1995 | ........... | G06F/15/16 |
| EP | 0 390 567 B1 | 9/1999 | ........... | H04L/29/06 |
| FR | 2 508 200 | 12/1982 | ........... | G06F/13/00 |

*Primary Examiner*—Robert Beausoliel
*Assistant Examiner*—Christopher McCarthy
(74) *Attorney, Agent, or Firm*—Kirkpatrick & Lockhart Nicholson Graham LLP

(57) ABSTRACT

Methods and apparatus for implementing high-bandwidth memory subsystems in a multiprocessor computing environment. Each component in the memory subsystem has a recalibration procedure. The computer provides a low-frequency clock signal with a period substantially equal to the duration between recalibration cycles of the components of the memory subsystem. Transitions in the low-frequency clock signal initiate a deterministically-determined delay. Lapse of the delay in turn triggers the recalibration of the components of the memory subsystem, ensuring synchronous recalibration. Synchronizing the recalibration procedures minimizes the unavailability of the memory subsystems, consequently reducing voting errors between CPUs.

13 Claims, 5 Drawing Sheets

U.S. PATENT DOCUMENTS

| | | | | |
|---|---|---|---|---|
| 4,574,348 A | 3/1986 | Scallon | 364/200 |
| 4,590,554 A | 5/1986 | Glazer et al. | 364/200 |
| 4,608,631 A | 8/1986 | Stiffler et al. | 364/200 |
| 4,608,688 A | 8/1986 | Hansen et al. | 371/11 |
| 4,637,024 A | 1/1987 | Dixon et al. | 371/67 |
| 4,672,613 A | 6/1987 | Foxworthy et al. | 371/38 |
| 4,674,037 A | 6/1987 | Funabashi et al. | 364/200 |
| 4,677,546 A | 6/1987 | Freeman et al. | 364/200 |
| 4,695,975 A | 9/1987 | Bedrij | 364/900 |
| 4,700,292 A | 10/1987 | Campanini | 364/200 |
| 4,716,523 A | 12/1987 | Burrus, Jr. et al. | 364/200 |
| 4,719,568 A | 1/1988 | Carrubba et al. | 364/200 |
| 4,774,659 A | 9/1988 | Smith et al. | 364/200 |
| 4,866,604 A | 9/1989 | Reid | 364/200 |
| 4,920,540 A | 4/1990 | Baty | 371/61 |
| 4,924,427 A | 5/1990 | Savage et al. | 364/900 |
| 4,942,517 A | 7/1990 | Cok | 364/200 |
| 4,942,519 A | 7/1990 | Nakayama | 364/200 |
| 4,965,717 A * | 10/1990 | Cutts et al. | 714/12 |
| 4,993,030 A | 2/1991 | Krakauer et al. | 371/40.1 |
| 5,020,024 A | 5/1991 | Williams | 364/900 |
| 5,115,490 A | 5/1992 | Komuro et al. | 395/400 |
| 5,175,855 A | 12/1992 | Putnam et al. | 395/700 |
| 5,193,162 A | 3/1993 | Bordsen et al. | 395/425 |
| 5,193,180 A | 3/1993 | Hastings | 395/575 |
| 5,195,040 A | 3/1993 | Goldsmith | 364/443 |
| 5,231,640 A | 7/1993 | Hanson et al. | 371/68.3 |
| 5,276,860 A | 1/1994 | Fortier et al. | 395/575 |
| 5,280,612 A | 1/1994 | Lorie et al. | 395/600 |
| 5,280,619 A | 1/1994 | Wang | 395/725 |
| 5,283,870 A | 2/1994 | Joyce et al. | 395/200 |
| 5,295,258 A | 3/1994 | Jewett et al. | 395/575 |
| 5,317,726 A | 5/1994 | Horst | 395/575 |
| 5,321,706 A | 6/1994 | Holm et al. | 371/51.1 |
| 5,335,334 A | 8/1994 | Takahashi et al. | 395/425 |
| 5,357,612 A | 10/1994 | Alaiwan | 395/200 |
| 5,371,885 A | 12/1994 | Letwin | 395/600 |
| 5,386,524 A | 1/1995 | Lary et al. | 395/400 |
| 5,388,242 A | 2/1995 | Jewett | 395/425 |
| 5,404,361 A | 4/1995 | Casorso et al. | 371/40.1 |
| 5,423,037 A | 6/1995 | Hvasshovd | 395/600 |
| 5,423,046 A | 6/1995 | Nunnelley et al. | 395/750 |
| 5,426,747 A | 6/1995 | Weinreb et al. | 395/400 |
| 5,434,997 A * | 7/1995 | Landry et al. | 714/12 |
| 5,440,710 A | 8/1995 | Richter et al. | 395/417 |
| 5,440,727 A | 8/1995 | Bhide et al. | 395/444 |
| 5,440,732 A | 8/1995 | Lomet et al. | 395/600 |
| 5,454,091 A | 9/1995 | Sites et al. | 395/413 |
| 5,463,755 A | 10/1995 | Dumarot et al. | 395/475 |
| 5,465,328 A | 11/1995 | Dievendorff et al. | 395/182.13 |
| 5,475,820 A | 12/1995 | Ellison et al. | 395/846 |
| 5,479,648 A | 12/1995 | Barbera et al. | 395/750 |
| 5,497,476 A | 3/1996 | Oldfield et al. | 395/439 |
| 5,504,873 A | 4/1996 | Martin et al. | 395/438 |
| 5,513,314 A | 4/1996 | Kandasamy et al. | 395/182.04 |
| 5,524,212 A | 6/1996 | Somani et al. | 395/200.08 |
| 5,550,986 A | 8/1996 | DuLac | 395/280 |
| 5,551,020 A | 8/1996 | Flax et al. | 395/600 |
| 5,557,770 A | 9/1996 | Bhide et al. | 395/488 |
| 5,555,404 A | 10/1996 | Torbjørnsen et al. | 395/600 |
| 5,566,316 A | 10/1996 | Fechner et al. | 395/441 |
| 5,568,629 A | 10/1996 | Gentry et al. | 395/441 |
| 5,581,750 A | 12/1996 | Haderle et al. | 395/618 |
| 5,584,008 A | 12/1996 | Shimada et al. | 395/441 |
| 5,584,018 A | 12/1996 | Kamiyama | 395/492 |
| 5,586,253 A | 12/1996 | Green et al. | 395/185.06 |
| 5,586,310 A | 12/1996 | Sharman | 395/600 |
| 5,606,681 A | 2/1997 | Smith et al. | 395/413 |
| 5,608,901 A | 3/1997 | Letwin | 395/621 |
| 5,619,671 A | 4/1997 | Bryant et al. | 395/412 |
| 5,627,961 A | 5/1997 | Sharman | 395/182.04 |
| 5,628,023 A | 5/1997 | Bryant et al. | 395/800 |
| 5,632,031 A | 5/1997 | Velissaropoulos et al. | 395/611 |
| 5,651,139 A | 7/1997 | Cripe et al. | 395/490 |
| 5,664,172 A | 9/1997 | Antoshenkov | 395/604 |
| 5,682,513 A | 10/1997 | Candelaria et al. | 395/440 |
| 5,687,392 A | 11/1997 | Radko | 395/842 |
| 5,721,918 A | 2/1998 | Nilsson et al. | 395/618 |
| 5,724,581 A | 3/1998 | Kozakura | 395/618 |
| 5,742,792 A | 4/1998 | Yanai et al. | 395/489 |
| 5,745,913 A | 4/1998 | Pattin et al. | 711/105 |
| 5,754,821 A | 5/1998 | Cripe et al. | 395/491 |
| 5,784,699 A | 7/1998 | McMahon et al. | 711/171 |
| 5,794,035 A | 8/1998 | Golub et al. | 395/674 |
| 5,815,649 A | 9/1998 | Utter et al. | 395/112.04 |
| 5,838,894 A | 11/1998 | Horst | 395/182.09 |
| 5,845,060 A * | 12/1998 | Vrba et al. | 714/12 |
| 5,850,632 A | 12/1998 | Robertson | 711/170 |
| 5,860,126 A | 1/1999 | Mittal | 711/167 |
| 5,890,003 A * | 3/1999 | Cutts et al. | 710/263 |
| 5,894,560 A | 4/1999 | Carmichael et al. | 395/845 |
| 5,918,229 A | 6/1999 | Davis et al. | 707/10 |
| 5,920,876 A | 7/1999 | Ungar et al. | 707/206 |
| 5,920,898 A | 7/1999 | Bolyn et al. | 711/167 |
| 5,933,838 A | 8/1999 | Lomet | 707/202 |
| 5,949,972 A | 9/1999 | Applegate | 395/185.07 |
| 5,953,742 A | 9/1999 | Williams | 711/154 |
| 5,956,756 A | 9/1999 | Khalidi | 711/207 |
| 5,959,923 A | 9/1999 | Matleson et al. | 365/222 |
| 5,960,459 A | 9/1999 | Thome et al. | 711/154 |
| 5,990,914 A | 11/1999 | Horan et al. | 345/521 |
| 5,996,055 A | 11/1999 | Woodman | 711/203 |
| 6,000,007 A | 12/1999 | Leung et al. | 711/105 |
| 6,012,106 A | 1/2000 | Schumann et al. | 710/22 |
| 6,012,120 A | 1/2000 | Duncan et al. | 710/129 |
| 6,016,495 A | 1/2000 | McKeehan et al. | 707/103 |
| 6,021,456 A | 2/2000 | Herdeg et al. | 710/260 |
| 6,026,465 A | 2/2000 | Mills et al. | 711/103 |
| 6,026,475 A | 2/2000 | Woodman | 711/202 |
| 6,047,343 A | 4/2000 | Olarig | 710/102 |
| 6,055,617 A | 4/2000 | Kingsbury | 711/203 |
| 6,065,017 A | 5/2000 | Barker | 707/202 |
| 6,067,550 A | 5/2000 | Lomet | 707/202 |
| 6,067,608 A | 5/2000 | Perry | 711/203 |
| 6,085,200 A | 7/2000 | Hill et al. | 707/202 |
| 6,085,296 A | 7/2000 | Karkhanis et al. | 711/147 |
| 6,098,074 A | 8/2000 | Cannon et al. | 707/200 |
| 6,105,075 A | 8/2000 | Ghaffari | 710/5 |
| 6,119,128 A | 9/2000 | Courter et al. | 707/202 |
| 6,119,214 A | 9/2000 | Dirks | 711/206 |
| 6,128,711 A | 10/2000 | Duncan et al. | 711/155 |
| 6,128,713 A | 10/2000 | Eisler | 711/159 |
| 6,134,638 A | 10/2000 | Olarig et al. | 711/167 |
| 6,138,198 A | 10/2000 | Garnett et al. | 710/129 |
| 6,141,722 A | 10/2000 | Parsons | 711/2 |
| 6,141,744 A | 10/2000 | Wing So | 712/35 |
| 6,141,769 A | 10/2000 | Petivan et al. | 710/10 |
| 6,263,452 B1 * | 7/2001 | Jewett et al. | 714/9 |
| 6,687,851 B1 * | 2/2004 | Somers et al. | 714/12 |
| 6,757,847 B1 * | 6/2004 | Farkash et al. | 714/39 |

* cited by examiner

COORDINATED RECALIBRATION OF HIGH BANDWIDTH MEMORIES IN A MULTIPROCESSOR COMPUTER

FIELD OF THE INVENTION

The present invention relates to implementing support for high-bandwidth random-access memory in a fault-tolerant computer. In particular, the present invention relates to methods and apparatus for supporting high-bandwidth memory in a synchronized multiprocessor computing environment.

BACKGROUND OF THE INVENTION

Referring to FIG. 1, a typical prior art computer includes a central processing unit (CPU) 12, a random-access memory (RAM) 20, and a mass storage device 32 connected by a system bus 18 that passes data and messages between components connected to the system bus 18. Computer performance can be increased, for example, by increasing the clock speed at which the CPU 12 operates. However, the increase in performance from an increase in clock speed is limited by the rate at which the system bus 18 conveys data between the components of computer 10.

Typically, system bus 18 has a lower clock rate than CPU 12. Thus, computer performance may also be increased by increasing the clock speed of the bus 18, thereby increasing the throughput of communications carried by the bus 18. One implementation of a high-bandwidth integrated memory subsystem using a bus with a fast clock is the RAMBUS specification from RAMBUS, Inc. of Los Altos, Calif. The RAMBUS system uses a 400 MHz clock with triggered on the rising and falling edges of the clock signal. Therefore, one line in a RAMBUS channel has a bandwidth of 800 Mb/s.

FIG. 2 depicts one embodiment of the RAMBUS integrated memory subsystem. The memory system typically includes a direct RAMBUS controller 50 and at least one RAMBUS Integrated Memory Module (RDRAM) 52 connected by direct RAMBUS channels 54 ending in a channel terminator 56. The controller 50 operates as a bus master for the memory subsystem: it generates requests, controls the flow of data, and keeps track of RDRAM refresh and states. The channel 54 is composed of thirty individual lines triggered on both edges of a 400 MHz clock signal, resulting in a 2.4 Gb/s throughput. The terminator 56 is a matched impedance absorbing any signals reaching the end of the channel 54 without any reflections.

In order to operate at this level of throughput, the operation of components in the RAMBUS subsystem is tightly monitored and periodically adjusted to maintain performance within predetermined tolerances. During these periodic recalibration events, the memory subsystem is not available for memory read or write transactions. In a single processor or asynchronous multiprocessor computer, this recalibration results in a short delay when the memory subsystem is unavailable. However, unsynchronized recalibration events can cause errors in a synchronized multiprocessor computing environment.

Certain prior art computer systems achieve fault tolerance through multiply-redundant system components. Each computer has multiple CPUs, each CPU having its own memory subsystem and other support electronics. The CPUs are cycle-synchronized to run identical copies of the same program simultaneously. Additional logic monitors the output of each CPU at a given point in time and, if the outputs disagree, restarts or initiates a diagnostic sequence to correct or identify the problem. If each CPU is equipped with a high-bandwidth memory subsystem that requires periodic recalibration, then the output of each individual CPU will appear to stall during a recalibration period. If recalibration among multiple memory subsystems is uncoordinated, then during recalibration events the outputs of the CPUs may vary, inducing monitor logic to halt or restart the system. Therefore, it is desirable to implement high-bandwidth memory in a lockstepped multiprocessor computing environment while avoiding delay-induced voter miscompares and other problems.

SUMMARY OF THE INVENTION

The present invention relates to the problem of implementing high-bandwidth memory in a multiprocessor computing environment. One object of the invention is to provide methods for synchronized recalibration among multiple hardware devices connected to a memory bus in a fault-tolerant computer. Yet another object of the invention is to provide a fault-tolerant computer with multiple integrated memory subsystems with synchronized memory recalibration.

In one aspect, the present invention is a method for providing synchronized recalibration of hardware devices on a memory bus in a fault-tolerant computing environment. A computer is provided with at least two central processing units (CPUs) and at least two hardware devices, each hardware device associated with one CPU and having a recalibration procedure with a non-zero duration. A deterministically-computed delay is used to simultaneously initiate recalibration among the hardware devices. In one embodiment, a maintenance clock signal is generated with a period substantially equal to the duration between recalibration cycles of the components of the memory subsystem and is used to trigger the deterministically-computed delay. In another embodiment, the initiation of the recalibration procedure occurs when a change in the maintenance clock signal changes the state of a reset signal, in turn initiating a deterministically-computed delay whose lapse initiates the recalibration procedure. In one embodiment, the change in the maintenance clock signal is an edge transition. In another embodiment, the change in the reset signal is a deassertion of the reset signal. In still another embodiment, the change in the reset signal is an assertion of the reset signal. In yet another embodiment, the deterministically-computed delay is an integer multiple of a system clock signal with a system clock period. In another embodiment, the hardware devices are RAMBUS memory controller hubs (MCH). In yet another embodiment, the hardware devices are RAMBUS memory repeater hubs (MRH).

In another aspect, the present invention is a fault tolerant computer with synchronized memory recalibration. The computer includes at least two CPUs in synchronized operation and at least two hardware devices having recalibration procedures, each hardware device connected to a CPU through a memory bus and having a recalibration procedure. The computer also includes a synchronizer connected to the hardware devices and operating to synchronize the execution of the recalibration procedures among hardware devices. In one embodiment, the hardware devices are MCHs. In another embodiment, the hardware devices are MRHs. In yet another embodiment, the computer includes a clock generator connected to the synchronizer, receiving a system clock signal and generating a maintenance clock signal to initiate the recalibration procedure in the hardware devices. In still another embodiment, the computer includes a temperature sensor connected to the synchronizer and thermally connected to the hardware devices, measuring their temperature. In yet another embodiment, the computer includes a current sensor connected to the synchronizer and electrically connected to the hardware devices, measuring the output current from the hardware devices.

BRIEF DESCRIPTION OF THE DRAWINGS

These and other advantages of the invention may be more clearly understood with reference to the specification and the drawings, in which.

In the drawings, like reference characters generally refer to the same parts throughout the different views. The drawings are not necessarily to scale, emphasis instead being placed upon illustrating the principles of the invention.

DETAILED DESCRIPTION OF THE INVENTION

In brief overview, Applicants' invention provides methods and apparatus for implementing high-bandwidth memory subsystems in a multiprocessor computing environment. Each component in the memory subsystem has a recalibration procedure. The computer provides a low-frequency clock signal with a period approximately equal to the duration between recalibration cycles of the components of the memory subsystem. Transitions in the low-frequency clock signal initiate a deterministically-determined delay. Lapse of the delay in turn triggers the recalibration of the components of the memory subsystem, ensuring synchronous recalibration. Synchronizing the recalibration events minimizes the unavailability of the memory subsystems, consequently reducing voting errors between synchronized CPUs.

Although the present invention is discussed in terms of RAMBUS technologies, it is to be understood that the present invention encompasses embodiments using other high-bandwidth memory subsystems whose components require recalibration, including but not limited to double data rate synchronous dynamic RAM (DDRSDRAM).

Figure 1:
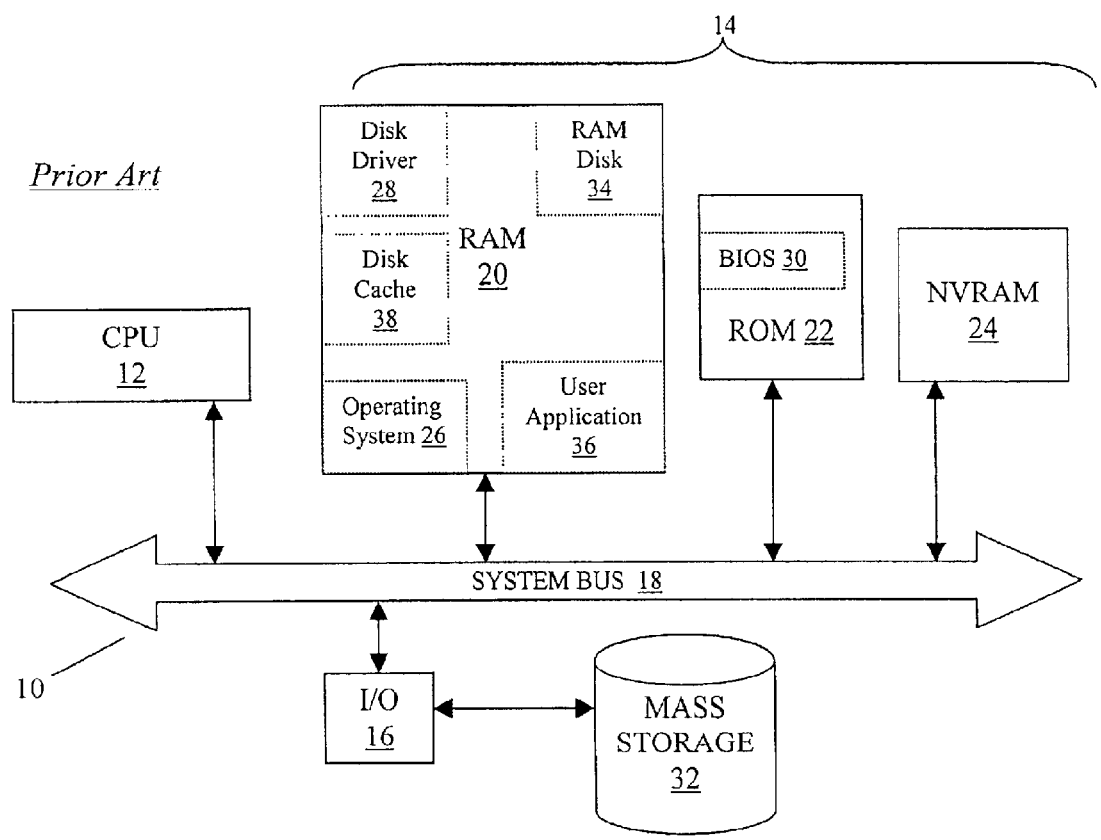
FIG. 1 is a block diagram of a prior art computer.
Figure 2:
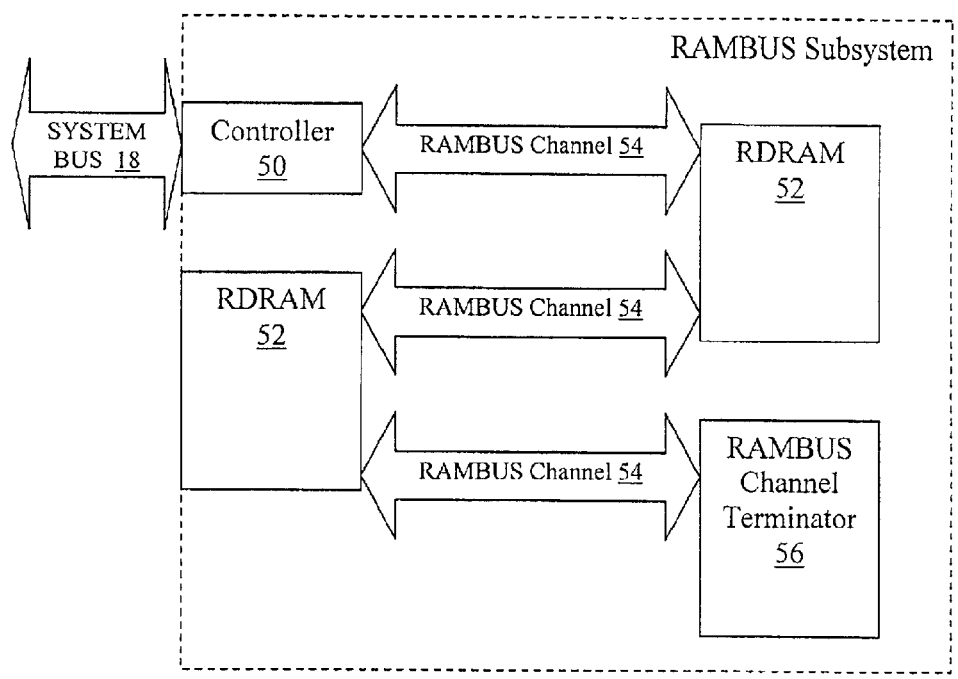
FIG. 2 is a block diagram of a prior art RAMBUS integrated memory subsystem.
Figure 3:
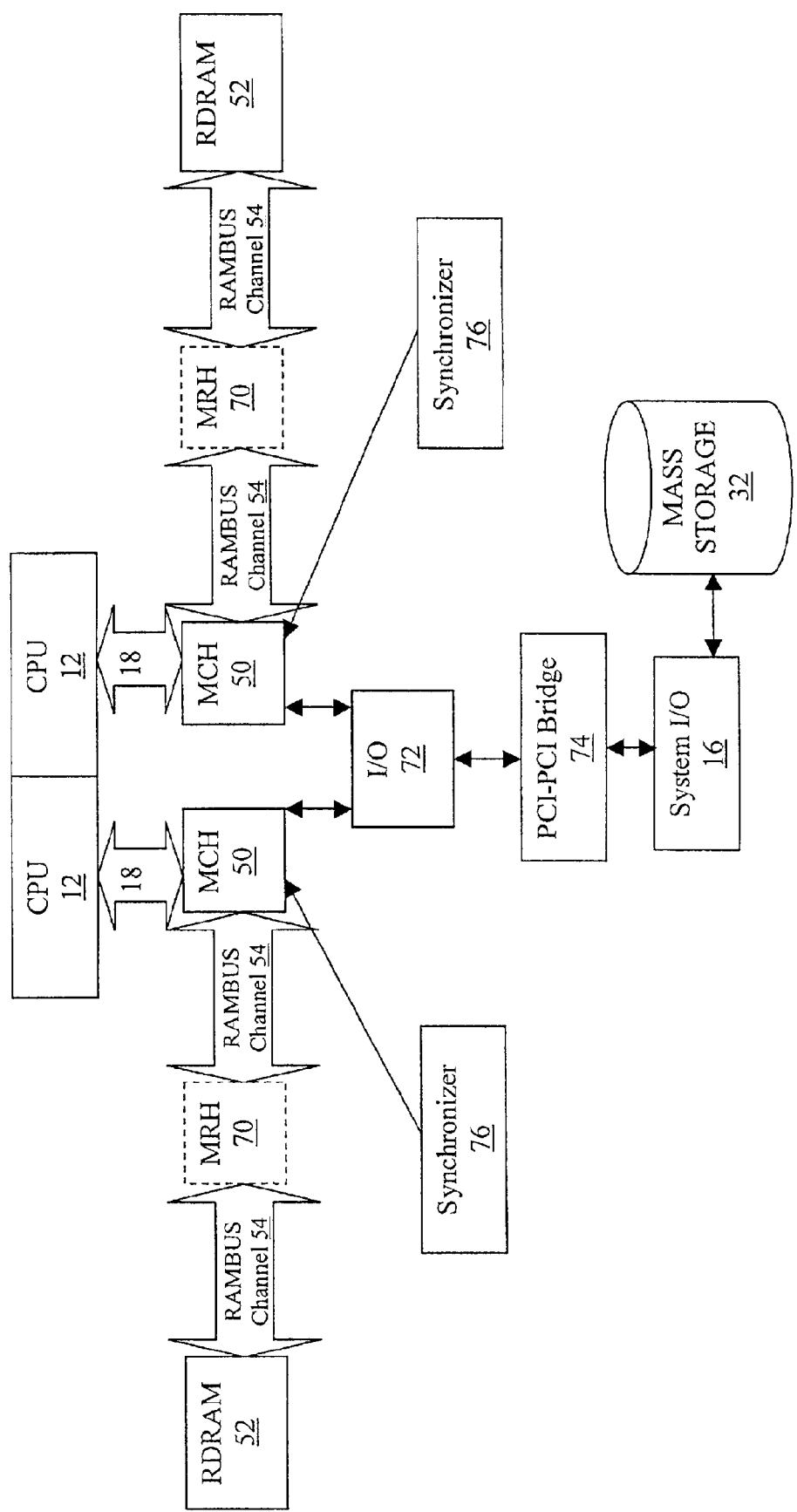
FIG. 3 is a block diagram of a multiprocessor computer in accord with the present invention.

Referring to FIG. 3, a computer in accord with the present invention includes multiple CPUs 12. In a preferred embodiment, the computer uses four CPUs 12 based on the IA-64 CPU architecture from INTEL CORPORATION of Santa Clara, Calif. The CPUs 12 operate in synchronous lockstep. That is, at a given point in time every CPU 12 executes the same instruction as every other CPU 12. Each CPU 12 is associated with its own integrated memory subsystem. For ease of illustration, FIG. 3 depicts two CPUs 12, each associated with its own high-bandwidth memory subsystem requiring periodic recalibration. It is to be understood that the preferred embodiment of the invention is directed to four CPUs, although in principle the present invention extends to any multiprocessor computing environment.

The CPUs 12 are each connected to their own memory controller hub (MCH) 50 via a system bus 18. The MCH 50 operates as a bus master for the memory subsystem, generating requests, controlling the flow of data, and keeping track of RDRAM refresh and states. In a preferred embodiment, the MCH 50 is an 82840 Memory Controller Hub from INTEL CORPORATION of Santa Clara, Calif. The 82840 MCH directly supports dual channels of Direct RAMBUS memory using RAMBUS signaling level technologies. In this configuration, the MCH 50 does not require a memory repeater hub (MRH) 70. In another embodiment, the computer in accord with the present invention uses DDR-SDRAM. In this case, the MCH 50 requires a MRH 70 to implement high-bandwidth memory.

The 82840 MCH provides a memory bandwidth of 3.2 Gb/sec. To achieve this data rate, it is necessary to maintain RAMBUS channel parameters, such as device output current and temperature, within certain predetermined ranges. For example, in embodiments using the MRH 70, the MRH 70 requires periodic recalibration to maintain its temperature within a predetermined operating range. Periodically the temperature of the MRH 70 is measured and the slew rate of the output drivers of the MRH 70 are adjusted to correct any temperature drift. In one embodiment using the Intel 840 chipset, this recalibration procedure takes 350 nanoseconds, making the memory subsystem unavailable for read and write transactions during this period.

Since each recalibration period renders a memory subsystem unavailable for use, a CPU 12 can appear to halt operation while it waits for its memory subsystem to finish recalibration. If the CPUs of the computer are designed to operate in lockstep, then unsynchronized recalibrations among memory subsystems will cause individual processors to periodically stall, resulting in different output streams among the CPUs. If additional logic is present to compare the CPU outputs to facilitate error detection, then unsynchronized recalibrations will incorrectly appear as errors, although in principle the system may be operating correctly.

This problem is addressed by the addition of a synchronizer 76 to generate signals to initiate the recalibration of the memory subsystem components in a controlled fashion. The synchronizer 76 receives a low-frequency maintenance clock signal. The period of the maintenance clock signal is substantially equal to the duration between recalibration cycles of the components of the integrated memory subsystem. In some embodiments, the maintenance clock signal has a period that is an integer multiple of a higher-frequency system clock signal.

Transitions in the maintenance clock signal initiate a predetermined deterministically-computed delay. Lapse of that delay in turn initiates the assertion of a reset signal routed to the MCH 50 and in turn to the CPUs 12, initiating a coordinated recalibration among the components of the integrated memory subsystems. Coordinated memory recalibration ensures that the integrated memory subsystems are simultaneously unavailable for the same amount of time, minimizing the disruption in a synchronous multiprocessor computing environment.

Figure 4:
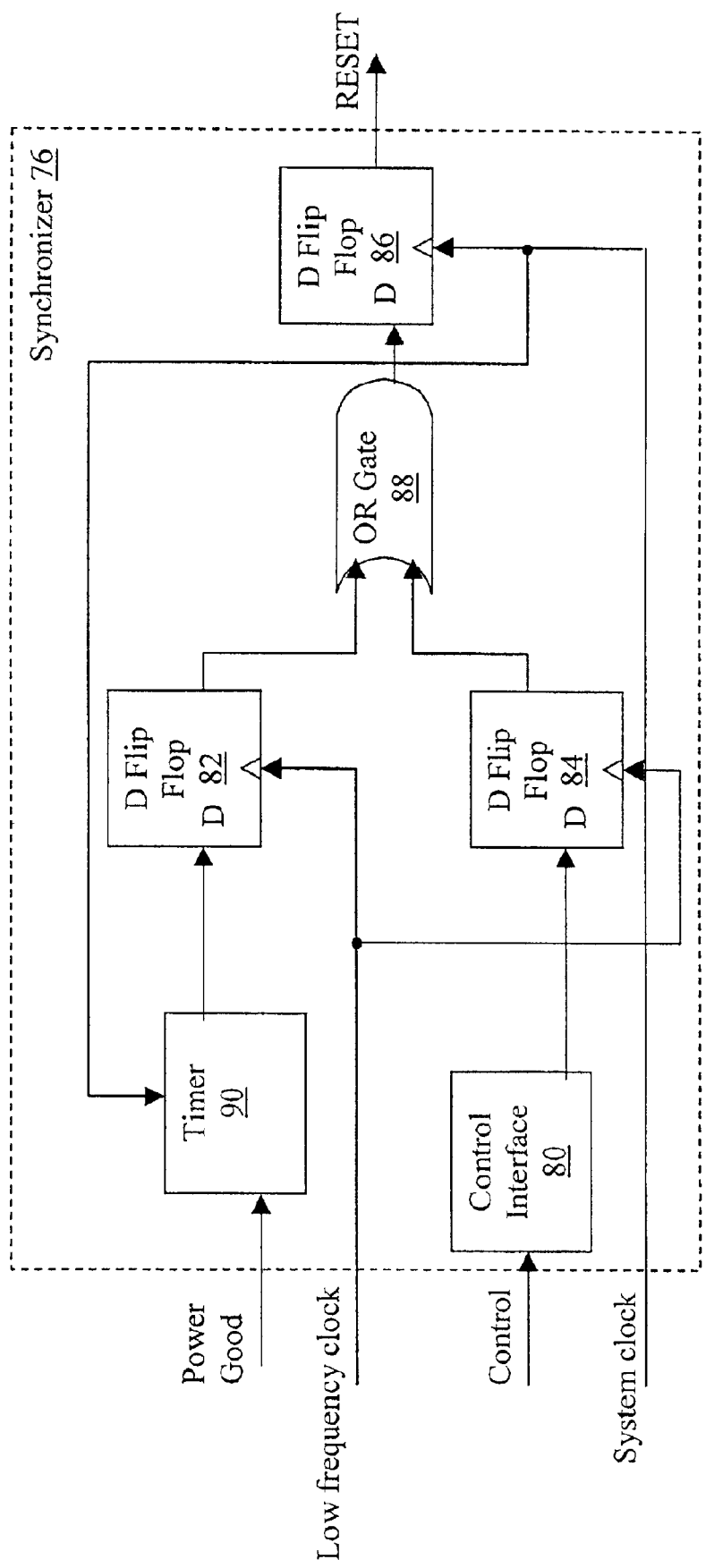
FIG. 4 is a block diagram of the synchronizer 76 of FIG. 3.

FIG. 4 depicts one embodiment of the synchronizer 76 of FIG. 3. The RESET signal initiates the recalibration process in the components of the integrated memory subsystems. By driving flip flops 82 and 84 with the low-frequency maintenance clock signal, the changes in state in the RESET signal are synchronized to changes in state in the maintenance clock signal. Similarly, driving flip flop 86 with the system clock ensures that changes in state in the RESET signal are synchronized to changes in state in the system clock signal. Together, these multiple flip flop stages ensure that changes in state in the RESET signal are synchronized with changes in state in both the system clock and maintenance clock signals.

The RESET signal is asserted under two conditions. First, the RESET signal is asserted in the event of power-on or a system restart after the passage of a predetermined delay determined by timer 90. Second, the RESET signal is asserted upon the application of an asserted signal to the line to the control interface 80. The control interface line may be asserted by hardware or software to initiate a synchronized recalibration of the components of the integrated memory subsystems. In one embodiment, an individual hardware device initiates a recalibration event in all of the integrated memory subsystems by placing a signal on this line.

Figure 5:
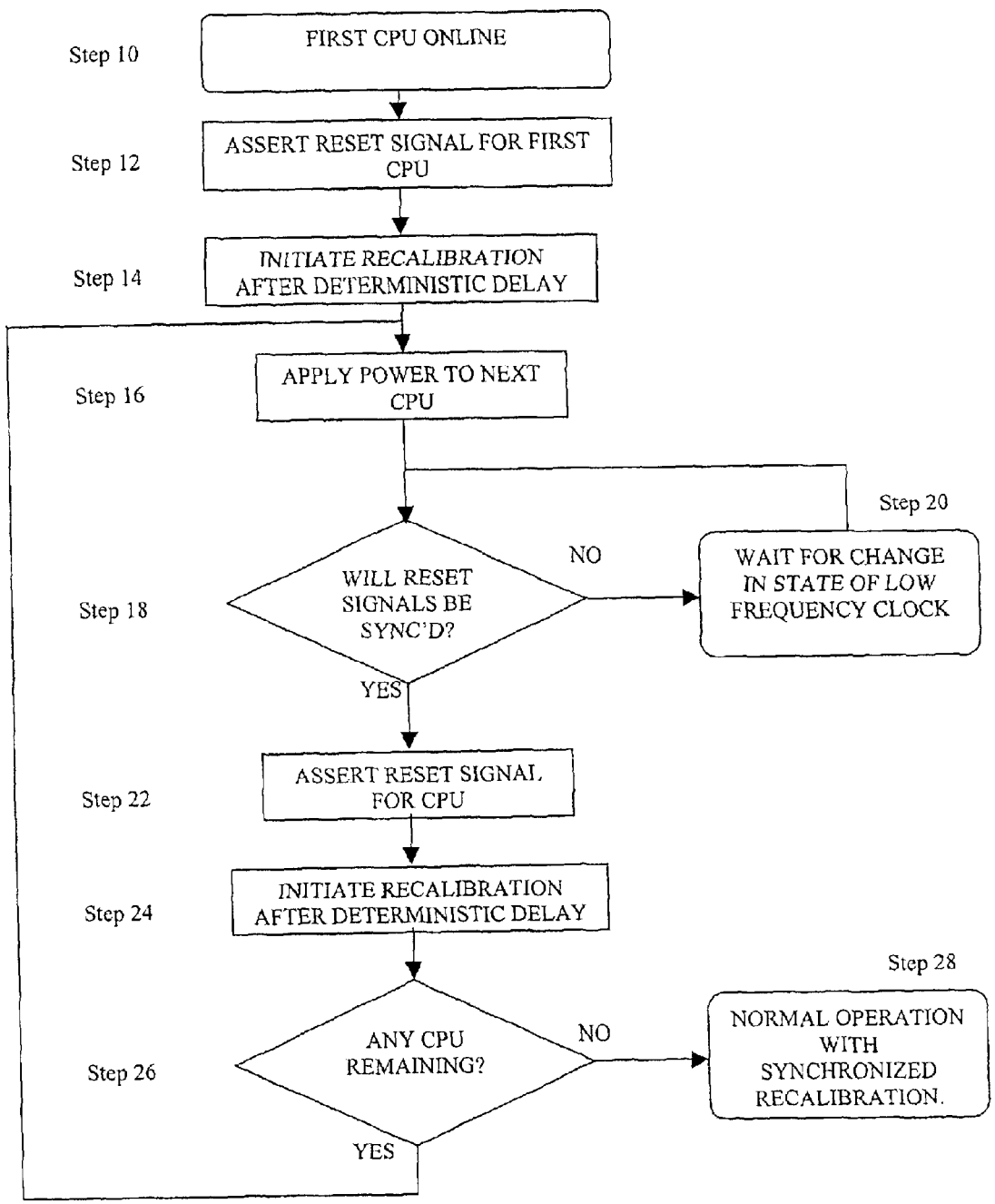
FIG. 5 is a flowchart of a method for synchronized recalibration in accord with the present invention.

FIG. 5 depicts a flowchart describing the method used to align the memory maintenance cycles between memory subsystems at system start-up. At power up, the first CPU is brought on line (Step 10). The RESET signal is asserted (Step 12), and after the passage of a deterministic delay, the first memory maintenance cycle in the first integrated memory subsystem occurs (Step 14). The next CPU is brought online (Step 16), but the RESET signal for the next CPU is asserted (Step 22) only if the RESET signals between the CPUs are synchronized. In a preferred embodiment, the RESET signals are synchronized by delaying assertion until the passage of an integer multiple of system clock cycles since the assertion of the previous RESET signal. In another embodiment, the same result is achieved by delaying assertion until the lapse of an integer multiple of lower frequency maintenance clock cycles.

After the next RESET signal is asserted (Step 22), a deterministic delay passes before the recalibration cycle in the next memory subsystem is initiated (Step 24). At this point, the recalibration cycles between the memory subsystems have been synchronized. The process repeats itself for the remaining CPUs (Step 26) before normal system operation ensues (Step 28). In normal operation, recalibration among memory subsystems continues to operate synchronously.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. The following claims are thus to be read as not only literally including what is set forth by the claims but also to include all equivalent elements for performing substantially the same function in substantially the same way to obtain substantially the same result, even though not identical in other respects to what is shown and described in the above illustrations.

What is claimed is:

1. A method for providing synchronized recalibration of hardware devices in electrical communication with a memory bus in a fault-tolerant computing environment, said method comprising the steps:

(a) providing a computer having a first and second synchronized central processing units (CPUs) and first and second hardware devices having a recalibration procedure, wherein said first hardware device is associated with said first CPU and said second hardware device is associated with said second CPU;

(b) initiating said recalibration procedure in said first and second hardware devices after the passage of a deterministically-computed delay; and (c) generating a maintenance clock signal with a period substantially equal to the duration between iterations of said recalibration procedures, wherein the maintenance clock signal is used to initiate the deterministically-computed delay of step (b).

2. The method of claim 1, wherein step (b) comprises the steps:

(b-a) changing the state of a reset signal upon the occurrence of a change in said maintenance clock signal; and (b-b) initiating said recalibration procedure in said first and second hardware devices after the passage of a deterministically-computed delay triggered by the change in state of said reset signal.

3. The method of claim 2, wherein said change in said maintenance clock signal is an edge transition.

4. The method of claim 2 wherein changing the state of the reset signal comprises the step of deasserting the reset signal.

5. The method of claim 2, wherein changing the state of the reset signal comprises the step of asserting the reset signal.

6. A method for providing synchronized recalibration of hardware devices in electrical communication with a memory bus in a fault-tolerant computing environment, said method comprising the steps:

(a) providing a computer having a first and second synchronized central processing units (CPUs) and first and second hardware devices having a recalibration procedure, wherein said first hardware device is associated with said first CPU and said second hardware device is associated with said second CPU;

(b) initiating said recalibration procedure in said first and second hardware devices after the passage of a deterministically-computed delay; and (c) generating a system clock having a system clock period, wherein said deterministically-computed delay is an integer multiple of said system clock period.

7. A method for providing synchronized recalibration of hardware devices in electrical communication with a memory bus in a fault-tolerant computing environment, said method comprising the steps:

(a) providing a computer having a first and second synchronized central processing units (CPUs) and first and second hardware devices having a recalibration procedure, wherein said first hardware device is a first memory device connected to said first CPU through the memory bus and said second hardware device is a second memory device connected to said second CPU through the memory bust; and (b) initiating said recalibration procedure in said first and second hardware devices after the passage of a deterministically-computed delay, wherein step (a) further comprises providing hardware devices that are RAMBUS memory controller hubs (MCH).

8. A method for providing synchronized recalibration of hardware devices in electrical communication with a memory bus in a fault-tolerant computing environment, said method comprising the steps:

(a) providing a computer having a first and second synchronized central processing units (CPUs) and first and second hardware devices having a recalibration procedure, wherein said first hardware device is a first memory device connected to said first CPU through the memory bus and said second hardware device is a second memory device connected to said second CPU through the memory bus; and (b) initiating said recalibration procedure in said first and second hardware devices after the passage of a deterministically-computed delay, wherein step (a) further comprises providing hardware devices that are memory repeater hubs (MRH).

9. A fault-tolerant computer with synchronized memory recalibration, comprising:

a first central processing unit (CPU), a second CPU, in synchronized operation with said first CPU;

a first hardware device, in electrical communication with said first CPU through a memory bus and having a recalibration procedure;

a second hardware device, in electrical communication with said second CPU through a memory bus and having a recalibration procedure, wherein each of said first and second hardware devices is an integrated memory subsystem; and a synchronizer in electrical communication with said hardware devices, operating to synchronize the execution of the recalibration procedure in said first hardware device with the execution of the recalibration procedure in said second hardware device, wherein said hardware devices are RAMBUS memory controller hubs (MCH).

10. A fault-tolerant computer with synchronized memory recalibration, comprising:

a first central processing unit (CPU), a second CPU, in synchronized operation with said first CPU;

a first hardware device, in electrical communication with said first CPU through a memory bus and having a recalibration procedure;

a second hardware device, in electrical communication with said second CPU through a memory bus and having a recalibration procedure, wherein each of said first and second hardware devices is an integrated memory subsystem; and a synchronizer in electrical communication with said hardware devices, operating to synchronize the execution of the recalibration procedure in said first hardware device with the execution of the recalibration procedure in said second hardware device, wherein said hardware devices are memory repeater hubs (MRH).

11. A fault-tolerant computer with synchronized memory recalibration, comprising:

a first central processing unit (CPU), a second CPU, in synchronized operation with said first CPU;

a first hardware device, in electrical communication with said first CPU through a memory bus and having a recalibration procedure;

a second hardware device, in electrical communication with said second CPU through a memory bus and having a recalibration procedure;

a synchronizer in electrical communication with said hardware devices, operating to synchronize the execution of the recalibration procedure in said first hardware device with the execution of the recalibration procedure in said second hardware device; and a clock generator in electrical communication with said synchronizer, receiving a system clock signal and generating a maintenance clock signal to initiate the recalibration procedure in said hardware devices.

12. A fault-tolerant computer with synchronized memory recalibration, comprising:

a first central processing unit (CPU), a second CPU, in synchronized operation with said first CPU;

a first hardware device, in electrical communication with said first CPU through a memory bus and having a recalibration procedure;

a second hardware device, in electrical communication with said second CPU through a memory bus and having a recalibration procedure;

a synchronizer in electrical communication with said hardware devices, operating to synchronize the execution of the recalibration procedure in said first hardware device with the execution of the recalibration procedure in said second hardware device; and a temperature sensor in electrical communication with said synchronizer and thermally connected to first and second hardware devices, measuring the temperature of said hardware devices.

13. A fault-tolerant computer with synchronized memory recalibration, comprising:

a first central processing unit (CPU), a second CPU, in synchronized operation with said first CPU;

a first hardware device, in electrical communication with said first CPU through a memory bus and having a recalibration procedure;

a second hardware device, in electrical communication with said second CPU through a memory bus and having a recalibration procedure;

a synchronizer in electrical communication with said hardware devices, operating to synchronize the execution of the recalibration procedure in said first hardware device with the execution of the recalibration procedure in said second hardware device; and a current sensor in electrical communication with said synchronizer and first and second hardware devices, measuring the output current of said hardware devices.

* * * * *

UNITED STATES PATENT AND TRADEMARK OFFICE
CERTIFICATE OF CORRECTION

PATENT NO. : 6,874,102 B2
DATED : March 29, 2005
INVENTOR(S) : John W. Doody et al.

It is certified that error appears in the above-identified patent and that said Letters Patent is hereby corrected as shown below:

<u>Title page,</u>
Item [75] Inventors, "Michael James O'Keefe" should be corrected to read
-- Michael James O'Keeffe --.

Signed and Sealed this

Twenty-fourth Day of May, 2005

JON W. DUDAS
*Director of the United States Patent and Trademark Office*